United States Patent [19]

Komine

[11] 3,851,956
[45] Dec. 3, 1974

[54] PHOTOGRAPHIC OVERLAPPING APPARATUS HAVING SAFETY DEVICES FOR MOTION PICTURE CAMERAS

[75] Inventor: Yoshio Komine, Tokyo, Japan

[73] Assignee: Canon Kabushiki Kaisha, Shimomaruko, Ohta-ku, Tokyo, Japan

[22] Filed: Sept. 11, 1973

[21] Appl. No.: 396,300

[30] Foreign Application Priority Data
Sept. 14, 1972 Japan.............................. 47-92337

[52] U.S. Cl............................................. 352/91 C
[51] Int. Cl. ......................................... G03b 21/36
[58] Field of Search........ 352/91 R, 217, 91 C, 91 S

[56] References Cited
UNITED STATES PATENTS
3,748,029  7/1973  Sakaguchi........................... 352/91 S

*Primary Examiner*—Monroe H. Hayes
*Attorney, Agent, or Firm*—Toren, McGeady and Stanger

[57] ABSTRACT

A motion picture camera with a photographic overlapping apparatus provided with safety locking and arresting devices incorporated therein, where an overlapping operation control disc which when once actuated cannot be reset until one revolution with fadeout, rewind and fade-in transitions is completed controls the time interval of each transition and simultaneously adjust the angular positions of the shutter blades with reference to each other, and a safety locking slide for locking the means for adjusting the angular positions of the shutter blades is arranged adjacent to a safety crank which when displaced from its rest position permits the actuation of an overlapping operation actuating member, so that the camera is set to prevent accidental unintentional release of the photographic overlapping apparatus. In order to minimize the influence of damage occurred during overlapping operation, a safety arresting button which may be actuated at any time during overlapping operation also is provided in conjunction with a safety lever which arrests the controlling effect of the overlapping operation control disc when the safety arresting button is depressed to cause a pivotal movement of the safety lever.

14 Claims, 9 Drawing Figures

PHOTOGRAPHIC OVERLAPPING APPARATUS HAVING SAFETY DEVICES FOR MOTION PICTURE CAMERAS

BACKGROUND OF THE INVENTION

1. Field of the Invention

This invention relates to a motion picture camera with a overlapping apparatus having safety devices, and more particularly it relates to a photographic overlapping apparatus having an overlapping operation control means which, when once the overlapping operation control means is actuated, does not restore its original rest position unless one cycle consisting of a fade-out, rewind (rearward transport of film) and fade-in is completed, and of which the operation can be interrupted by actuation of an arresting means at any time during overlapping operation to thereupon permit normal operation for customary exposure.

2. Description of the Prior Art

Various apparatus have hitherto been proposed for providing overlapping photography with motion picture cameras. The overlapping photography includes three steps of (1) carrying out fade-out sequence, (2) rewinding a length of film equal to that used for the fade-out sequence, and (3) again exposing the rewound film with fade-in effect.

In performing such an overlapping photography with a conventional camera, the operation of the camera requires high standard technique, so that it has been difficult for amateurs to carry out the overlapping photography by the free use of such technique. In recent years, however, film magazines each compactly incorporating a roll of 8mm film have been offerred, while various compact type motion picture cameras which afford accommodation for such film magazines have been manufactured. It is still a recent event that cameras of compact type for general public use are improved in their performance so as to permit photographic operations of high standard technique such as overlapping operations by incorporation of an overlapping apparatus therein which is automated as much as possible for convenience of amateur's operation.

Apparatus which are so consructed that, upon actuation of an overlapping operation control member alone, all of the transitions of the overlapping photography are automatically performed in sequence are already known, as for example, in U.S. Pat. No. 3,637,301. An apparatus which permits selection of fading operations is disclosed in U.S. Pat. No. 3,246,944.

With a film magazine having a blocked takeup reel means which is available as Super 8 film magazine, the overlapping photography is performed usually in such a way that the takeup reel of the magazine is arrested for fadeout so that the space in the magazine collects film which is transported by a film transporting claw during fadeout in the form of loose loops. In the next rewinding step, the loosely stored film is transported rearwardly into the space sorrounding the supply reel of the magazine. In the final step, the film is transported forwardly and the takeup reel is rotated to collect the film which is exposed again with fade-in effect.

Overlapping apparatus for use with film magazines of the type described above are disclosed, for example, in U.S. Pat. Nos. 3,582,198 and 3,635,549.

These conventional overlapping apparatus of somewhat automated construction and particularly of fully automated construction have drawbacks in that because of the sequence of the steps of overlapping photography, a damage occurred in the magazine during operation interrupts the overlapping photography, and the magazine must be separated out of the camera to remove the damage and then installed in the camera, or otherwise the operation of the camera with the magazine cannot be continued, an in that although the automatic overlapping apparatus is very convenient for overlapping operation itself, a simple actuation such as "one-touch" button depression immediately causes the camera to operate in overlapping position, so that during the normal operation, or preparatory to photographing, it frequently happens that the operator of the camera depresses the button without the will of performing the overlapping photography. In order to minimize the influence of the mis-operation and damage occurred in such cases, there is much need of providing a mis-operation blocking mechanism which performs functions of interrupting the overlapping operation and resetting the camera for normal operation when the occurrence of damage is noted.

SUMMARY OF THE INVENTION

An object of the present invention is to provide a novel and improved photographic overlapping apparatus combined with safety devices from the standpoint of avoiding mis-operation and maintaining safety operation.

Another object of the present invention is to provide an overlapping apparatus comprising an apparatus capable of overlapping photography and safety means provided therein so that the transmission to overlapping operative position by accident, and the occurrence of unexpected damages during overlapping operation is immediately blocked, thereupon the camera being reset for normal operation of customary exposures.

Still another object of the present invention is to provide an overlapping apparatus provided with an overlapping operation control means which, when once a starter means for starting the overlapping operation is set, starts to operate and does not restore its original rest position until one cycle consisting of a fade-out, rewind and fade-in transitions is completed, characterized by provision of a safety means which is operable at any time during the overlapping operation and which when operated permits a safety switch connected in parallel with an arresting switch associated with a forwardly driving circuit of a drive motor to be turned on, thereby the arresting switch being made inoperative to perform normal operation of the camera.

It is further an object of the present invention to provide an overlapping apparatus incorporating a safety means capable, in a motion picture camera which affords accommodation for a film magazine having a takeup reel which is blocked against rotation in reverse direction, of releasing the means for arresting the takeup reel which is made operative during fade-out transition of overlapping photography in order to permit the rotation of the takeup reel.

It is further an object of the present invention to provide an overlapping apparatus provided with a safety device in which a fading and particularly overlapping operation control means which, when once a starter means is set, starts to operate and does not restore it original rest position until one cycle for fade-out and fade-in effect is completed is coupled with a safety means which is operable at any time during fading operation (fade-out or fade-in), so that, upon actuation of the safety means, the fading transition can be terminated, and/or customary exposures with normal shutter opening can be carried out.

It is further an object of the present invention to provde an overlapping apparatus having an overlapping operation control means which, when once a starter means is set, starts to operate and does not restore its original position until all of the transitions of overlapping photography is completed, characterized by provision of safety means capable of releasing an arresting means for arresting the starter means from the arresting position in interlocking relationship with a means for switching an automatic dissolving shutter mechanism from the manually operative position to the automatically operative position, so that the camera is set to prevent the transmission to operation with fading effect by accident.

Other objects and features which will become apparent from the detailed description of the invention taken in conjunction with the accompanying drawings.

BRIEF DESCRIPTION OF THE DRAWINGS

FIG. 5 is a back side view of the overlapping operation control means in the overlapping apparatus shown in FIGS. 3 and 4, FIG. 5A showing a position wherein a customary exposure is made, FIG. 5B showing a position just when fade-out is completed, and FIG. 5C showing a position just when the rewinding is completed.

DESCRIPTION OF THE PREFERRED EMBODIMENTS

Figure 1:
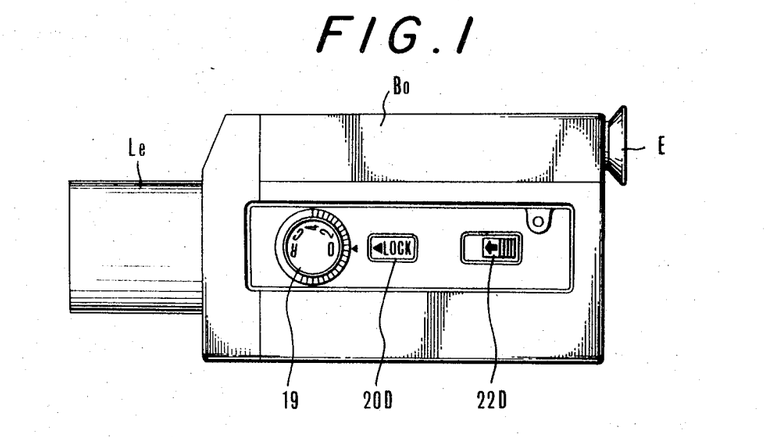
FIG. 1 is a side view of a motion picture camera adapted to incorporate an overlapping apparatus according to the present invention.

A motion picture camera shown in FIG. 1 comprises a camera body Bo including constitutional components necessary for the conventional camera structure, a lens barrel holding a lens system, and a view finder E at rearmost portion. A certain portion of its cover, for example, a side panel as shown in FIG. 1 is provided with a dissolving shutter control knob 19, a locking knob 20D for locking the dissolving shutter blades in a predetermined angular relationship, and an overlap starter knob 22D, these knobs cooperating for operation of the overlapping apparatus incorporated in the motion picture camera.

Figure 2:
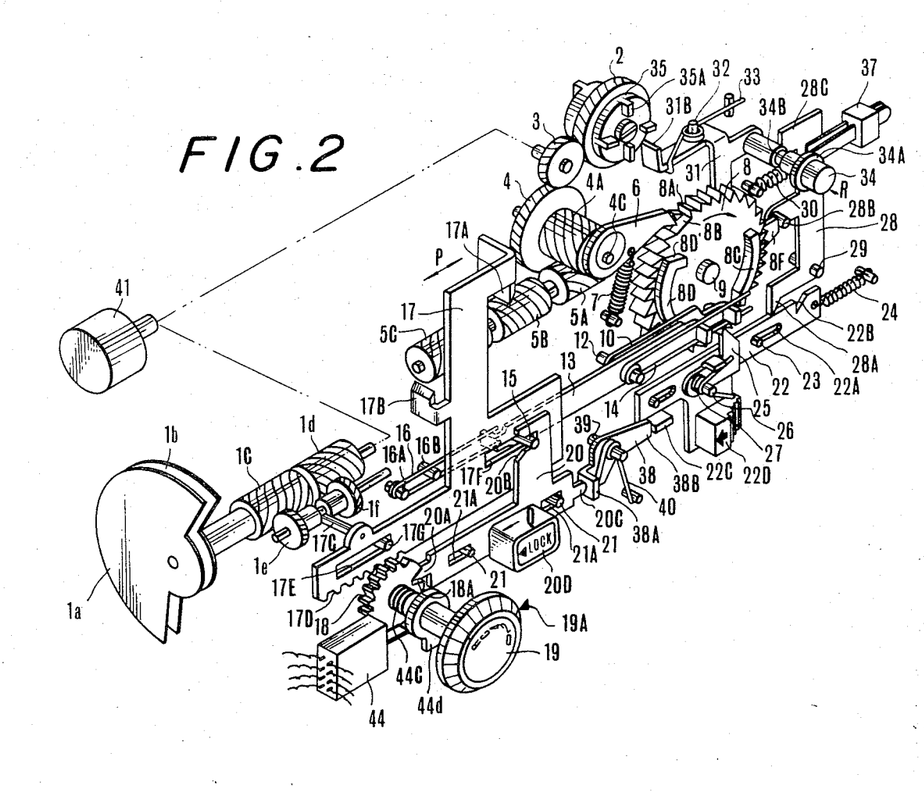
FIG. 2 is an exploded perspective view of one embodiment of the overlapping apparatus according to the present invention.
Figure 3:
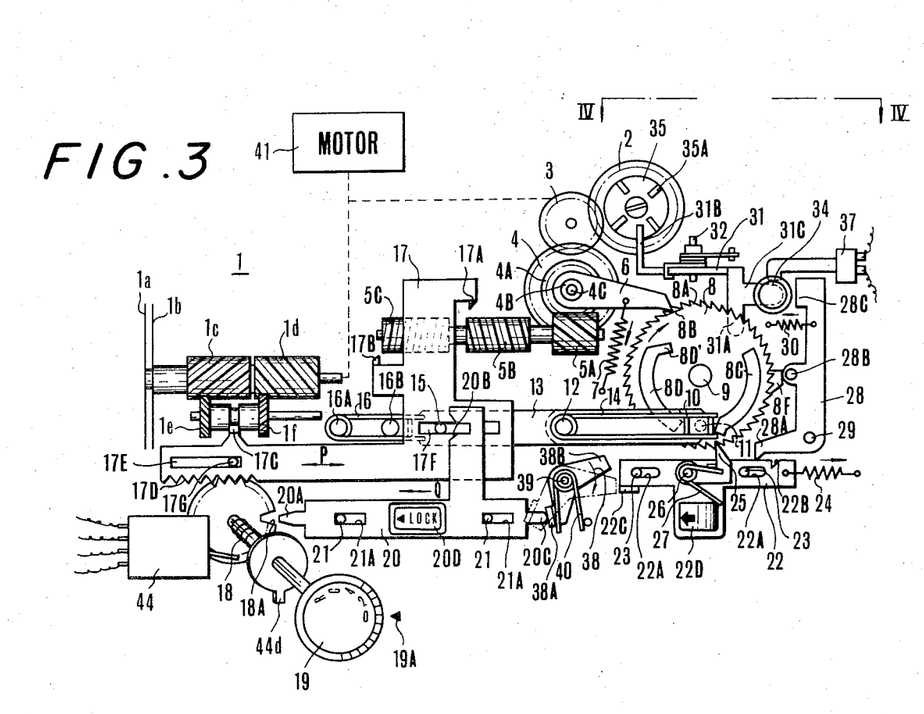
FIG. 3 is a partly diagrammatic, partly perspective and partly longitudinal vertical sectional view of the apparatus shown in FIG. 2, in a different operative position.

One embodiment of the overlapping apparatus according to the present invention which is adapted to receive a magazine of motion picture film having takeup reel means which is blocked against rotation in the opposite direction will be explained hereinbelow with reference to FIGS. 2 – 5 and FIG. 7. FIG. 2 illustrates the construction of the overlapping apparatus in which the dissolving shutter is locked in a fully open position, or, in a position where the cutouts of the shutter blades with vertex angle of, for example, 160° register with each other. In FIG. 3, the shutter blade registering means of the apparatus shown in FIG. 2 is released from the locked position to prepare overlapping photography.

Referring to the drawings, a dissolving shutter mechanism 1 of conventional structure comprises two adjustable shutter blades 1a, 1b, which are provided with wedge-shaped cutouts. The blades 1a, 1b are affixed to differential gears 1c, 1d, which mesh with driving gears 1e, 1f, respectively, these gears constituting a differential gear mechanism, so that by the movement of the driving gears 1e, 1f in a direction longitudinal to the axis of the differential gear arrangement, the angular positions of the shutter blades 1a, 1b are adjusted with reference to each other. This dissolving shutter mechanism is driven by a motor 41. The motor 41 also drives an intermediate gear 3 which meshes both with a gear 2 to rotate the core of a takeup reel and with a gear 4. The shaft 4C of the gear 4 carries a gear 4A meshing with a gear 5A. Coaxially affixed to the gear 5A are feed screws 5B, 5C which are threaded in directions opposite to each other. A ratchet pawl 6 is rotatably mounted on a pivot 4B which is eccentrically carried on the shaft 4C of the gears 4, 4A, and is biased downwardly by a helical spring 7 as shown in FIGS. 2 and 3 to bring the pallet of the ratchet pawl 6 into engagement with the teeth of a ratchet 8A on an overlap control disk 8 which rotates in a clockwise direction about a shaft 9 fixedly mounted on the housing of a motion picture camera when the ratchet pawl 6 is moved. The overlap control disk 8 has a pawl stop portion 8B provided by cutting off a tooth of the ratchet 8A, and it has also a fade-out cam 8C and a fade-in cam 8D on its one side face, the both cams being arranged so as to occupy substantially the same rotation angle. On the other face of the disk 8, there are provided a takeup reel control cam $8E_1$ and an electrical circuit control means to be described. The disk 8 has a projection 8F radially extending from its periphery over the ratchet teeth 8A. A shifter lever 10 pivotally mounted on a pivot pin 12 fixed on the housing has a cam follower 11 near the tip, the cam follower being engaged with the fade-out cam 8C during fade-out, or with the fade-in cam 8D during fade-in.

A lever 13 also is pivotally mounted on the pivot pin 12, and it is urged to cooperate together with the shifter lever 10 by a spring 14. The lever 13 has a pin 15 near the tip of the arm opposite to that paralleled with the shifter lever 10, and is normally held in the neutral position shown in FIGS. 2 and 3 by the engagement of the flanged portion of the lever 13 with a neutral spring 16 supported on pins 16A and 16B fixed to the housing. A fading slide 17 has pawls 17A and 17B which are engageable with the feed screws 5B and 5C respectively, and a projection 17C engaging the driving gears 1e, 1f of the dissolving shutter mechanism, being slidable along elongated slots 17E and 17F in cammming engagement with a pin 17G fixed on the housing and the pin 15 on the lever 13 respectively. As a means for displacing the slide 17 in a direction indicated by arrow P along the elongated slots, the slide 17 has a toothed portion 17D which forms a rack which meshes with a turnable open wedge control gear 18. The gear 18 is coaxially fixed on the spindle of a manually operable knob 19 for controlling the open wedge. The head of the knob 19 is marked with symbols 0 (fully open setting), 2 (½ times aperture), 4 (¼ times aperture) and C (totally closed), which when aligned with an index mark 19A on the housing indicates to the operator which position the dissolving shutter blades are set in. The gear 18 is provided with a notch 18A to which the projection 20A of a locking slide 20 to be described can be inserted. The slide 20 has two elongated slots 21A with which two rods 21 fixed on the housing are engaged, being movable along the elongated slots. When the projection 20A of the slide 20 is received in the notch 18A, the gear 18 is locked against rotation. An upper extension of the slide 20 has a notch 20B on the front edge near the top to receive the pin 15 on the lever 13. When the locking slide 20 is moved forward to lock the gear 18, the notch 20B is brought into engagement with the pin 15 so that the lever 13 comes to a halt in its neutral position. The slide 20 is further provided with a lug 20C on the end opposite to that having the tooth 20A which is arranged to actuate a crank 38 constituting part of a safety device to be described, and a knob 20D accessible to the operator which is displaceable in a direction indicated by arrow Q to lock the gear 18. The slide 20 is arrested by a known click mechanism not shown in the both locked and unlocked positions.

An overlap setting slide 22 has two elongated slots 22A with which rods 23 fixed on the housing are engaged and which is displaceable along the elongated slots. An overlap starter knob 22D for displacing the slide 22 which is drawn rearwardly by a helical spring 24. To set the slide 22 for overlapping operation, the knob 22D is pushed against the opposition of spring 24 (in the direction indicated by the arrow). The lever 22 has a notch 22B near the rear end and a protuberance 22C on the front lower edge. A blocking pawl 25 is mounted on a pivot 26 planted on the overlap setting slide 22 and is urged by spring 27 in the counterclockwise direction to engage the ratchet 8A of the overlap control disk 8. This blocks the disk 8 against counterclockwise or reverse rotation. A restoring lever 28 pivotally mounted on a pivot pin 29 fixed on the housing has a pallet 28A which the notch 22B can receive, a pin 28B which is engageable with the projection 8F of the disk 8, and a cramp 28C at the end farther from the the pivot pin 29 which a helical spring 30 normally biases in a counterclockwise direction.

A takeup reel arresting lever 31 which is pivotable about a pivot pin 32 fixed on the housing has a lower extension 31A which travels over a series of cams 8E provided on the back side of the overlap control disk 8, an an integral extension 31B which is engageable with, or disengageable from one of a plurality of lugs 35A of a disk 35 mounted on a shaft coaxial to that of the gear 2, the extensions 31A and 31B being arranged opposite with respect of the pivot pin 32, and the lever 31 being normally biased by a spring 33 in a clockwise direction as shown in FIGS. 2 and 3. Between the gear 2 and the disk 35, there is provided a friction clutch to rotate the latter in response to rotation of the gear 2.

Figure 4:
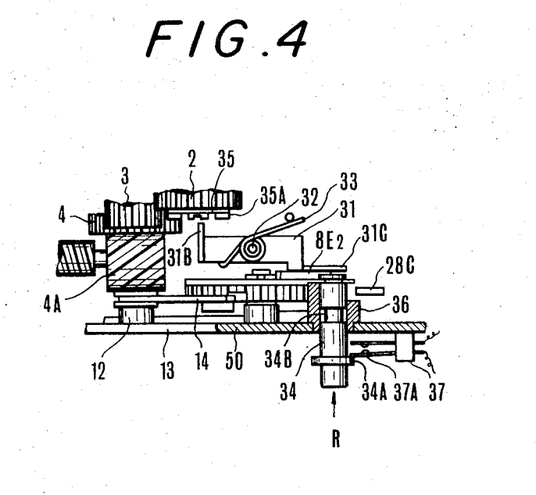
FIG. 4 is a fragmentary horizontal sectional view of the apparatus shown in FIG. 3 taken at the line IV — IV.

A button 34 which is more understandably illustrated in FIGS. 3 and 4 is despressable in the direction of arrow R shown in FIG. 3 along the guide member 36 which is made up in the form of a hollow shaft. The button has a flanged portion 34A and a channel 34B, and the lower end of the button reaches the extension 31C of the takeup reel arresting lever 31. A movable contact 37A of a switch 37 is arranged adjacent to the flanged portion 34A of the button 34 so that when the button is pushed down, the switch 37 is closed. The operation of the circuit formed thereby will be described later. The button 34 tends to move in the direction opposite to that indicated by arrow R under action of the movable contact 37A. The channel 34B of the button is brought into engagement with the cramp 28C of the restoring lever 28 when thhe button 34 is pushed down.

Located between the locking lever 20 and the overlap setting lever 22 is a crank 38 which forms part of the safety means for overlapping operation, and which is pivotable about the pivot spin 39 fixed on the housing and biased by a spring 40 in a clockwise direction. One arm 38A of the crank 38 is always in contact with the lug 20C of the locking slide 20 while the other arm 38B is engageable with or disengageable from the overlap setting lever 22.

Figure 7:
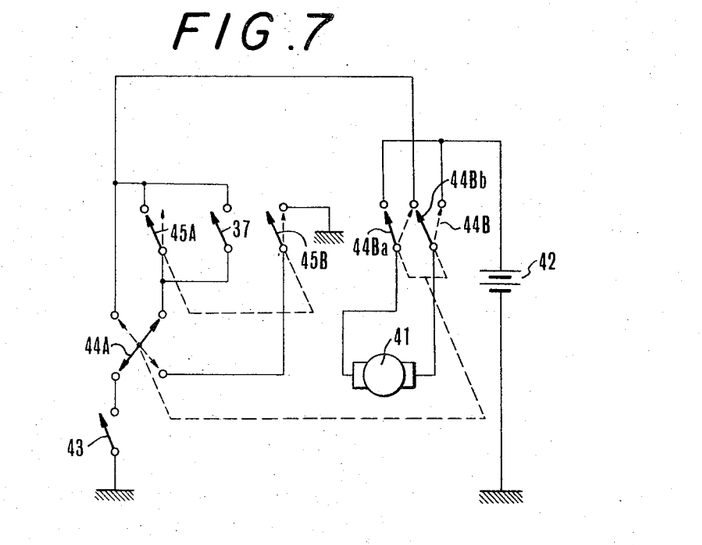
FIG. 7 is a diagram of the electrical circuit adapted for use with each embodiment of the overlapping apparatus of the present invention.

FIG. 7 is a diagram of an electrical circuit which controls the above mentioned mechanism. Referring to the figure, the circuit comprises a drive motor 41, a battery source 42, a shutter release switch 43 of the camera, a reversing switch assembly 44A, 44B for reversing the motor 41 from the forward rotation (the position shown by solid lines) to the reverse rotation (the position indicated by broken lines), or vice versa. an overlap control switch assembly 45A, 45B which is transferred between the open position and closed position by revolution of the overlap control disk 8 and a safety switch which is closed by depression of the button 34 constituting part of the safety means and which is connected in parallel with the overlap control switch 45A.

Figure 5A:
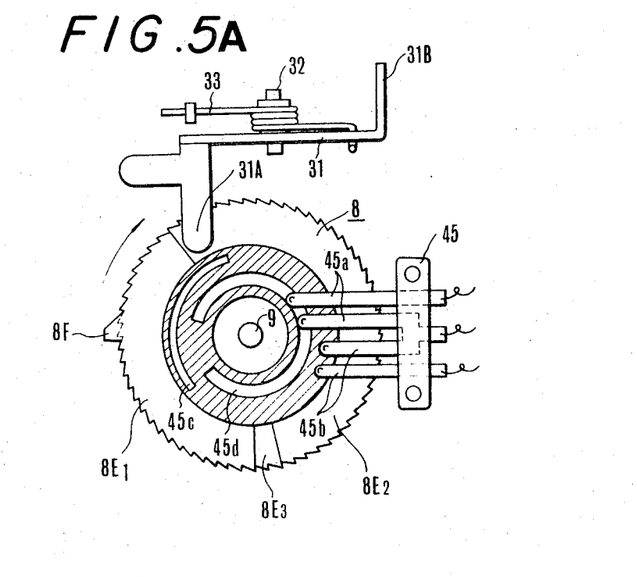
Figure 5B:
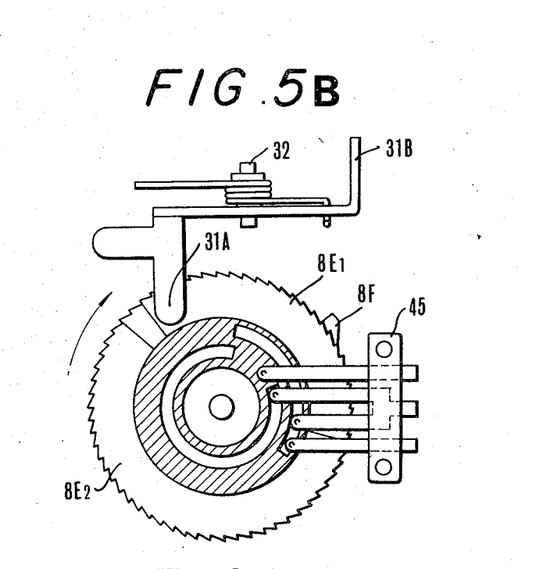
Figure 5C:
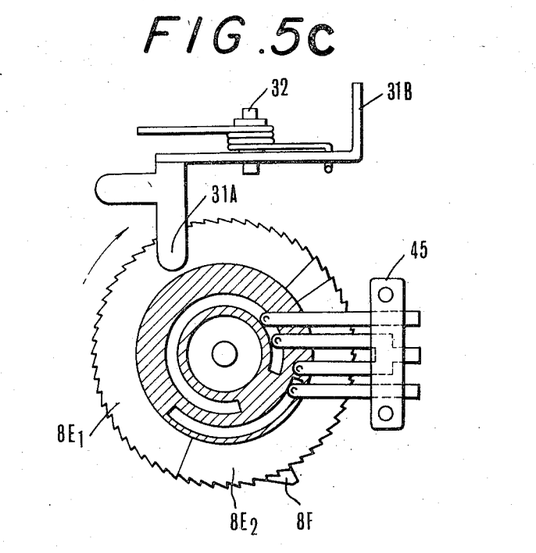

In FIG. 5, the structure of the back face of the overlap control disk 8 is illustrated as comprising a lowered cam $8E_1$, an elevated cam $8E_2$ and an inclined cam $8E_3$ located between the cams $8E_1$ and $8E_2$. A cam follower 31A which travels over these cams 8E is pivotable about the pivot pin 32 against opposition of a spring 33. The disk 8 is allowed to rotate only in the direction of the arrow, and one revolution of the disk 8 controls all of the transitions, that is, fade-out — rewind — fade-in. Adjacent to the disk 8, there is further provided a switch assembly 45 of which the contacts 45a and 45b constituting a part of switches are brought into contact with the conductive portions arranged in ring shape in accordance with the overlapping operation. The positions of the switches relative to the cam $8E_1$ are illustrated in FIGS. 5A, 5B and 5C in accordance with the corresponding transistions.

The operation of the overlapping apparatus of such construction will be explained herebelow.

CUSTOMARY EXPOSURE

In normal operation, the two shutter blades 1a, 1b are positioned to define an aperture of maximum size, for example, an aperture with a vertex angle of 160°, and the tooth 20A of the locking slide 20 is engaged in the notch 18A of the gear 18. The ratchet pawl 6 is positioned on the stop portion 8B of the ratchet 8A provided on the outer periphery of the overlap control disk 8, so that the reciprocating movement of the ratchet pawl 6 does not cause the overlap control disk 8 to rotate. The extension 31A of the takeup reel arresting lever 31 is lifted up on the cam $8E_2$, provided on the back face of the disk 8 as shown in FIG. 4, so that the extension 31B is held in escapement from the disk 35. In this arrangement, the switches of the electrical circuit shown in FIG. 7 assume the positions shown in FIGS. 5A and 7. Upon closure of the release switch 43, the driving circuit of the drive motor 41 is formed that can be traced from the anode of the battery 42 through a switch contact 44B$a$, the winding of the motor 41, a switch contact 44B$b$, switches 45A, 44A, and the release switch 43 to the earth, so that the motor rotates in forward direction to carry out normal operation of customary exposure.

EXPOSURE WITH OVERLAP EFFECT

In preparing an overlapping photography, the knob 20D of the locking slide 20 is moved to the right in FIGS. 2 and 3 to disengage the tooth 20A from the notch 18A of the gear 18, thereby the gear 18 is made turnable. The backward movement of the slide having the lug 20C on the rear end causes the safety crank 38 to turn about the pivot 39 against opposition of the spring 40 in a counterclockwis direction, the other arm 38B moving away from the path of the overlap setting slide 22, so that the knob 22D of the slide 22 can be advanced as indicated by the arrow symbol. When the slide 22 is advanced, the disk 8 is slightly rotated in a clockwise direction in engagement with the stop pawl 25 so that the ratchet pawl 6 is brought into engagement with the first tooth of the ratchet teeth 8A, while the slide 22 is locked on in an advanced position because the notch 22B of the slide 22 receives the pallet 28A of the restoring lever 28.

By the above mentioned setting, the apparatus is made ready for overlapping photography. In the next place, upon the closure of the shutter release switch 43 of the camera, the drive motor 41 starts to drive the ratchet pawl through the gear train 2, 3, 4 and 4A, whereupon the disk 8 rotates tooth by tooth in a clockwise direction. AT the same time, the extension 31A of the takeup reel arresting lever 31 drops from the elevated cam portion $8E_2$ to the lowered cam portion $8E_1$ provided on the back face of the disk 8, assuming the position shown in FIG. 5A, so that the arresting lever 31 turns about the pivot 32 in a clockwise direction to bring the extension 31B into engagement of one of the ribs 35A of the disk 35 mounted on the shaft of the takeup reel as shown in FIG. 2, thereby the takeup reel is blocked against rotation. Therefore, although the film is normally transported by a conventional film transporting mechanism, a length of film is loosely stored without being convoluted in the space surrounding the takeup reel in the film magazine.

A. Exposures with Fade-out Effect

As the overlap control disk 8 rotates, the pin 11 planted on the pivotable lever 10 rides on the internal periphery of the fade-out cam 8C provided on the front face of the disk 8, being pivoted in a counterclockwise direction about the pivot 12, so that the lever 13 which is urged by spring 14 to cooperate with the lever 10 also is turned about the pivot 12 in a counterclockwise direction. At the same time, the pin 15 planted on the other arm of the lever 13 also is displaced in a counterclockwise direction to pull-down the fading slide 17 in engagement with the elongated slot 17F, thereupon the pawl 17A is displaced and brought into engagement with the screw 5B. The screw 5B which is being driven to rotate from the drive motor 41, displaces the fading slide 17 along the elongated slots 17E, 17F to the right in the figure, and simultaneously displaces the differential driving gears 1$e$, 1$f$ constituting part of the dissolving shutter mechanism. The rotation of the differential gears 1$e$, 1$d$ engaging with the differential gears 1$e$, 1$f$ causes the shutter blades 1$a$, 1$b$ to be transmitted from the fully open position to the closed position. At the same time, the gear 18 is turned in a clockwise direction by the rack 17D, and the manually operable aperture adjusting knob 19 coaxial to the gear 18 is turned so that the symbol [O] – [C] in alignment with the index mark 19A indicates to the operator what value the aperture is adjusted to. When the shutter blades have assumed the closed position, the pin 11 sliding on the internal periphery of the fade-out cam 8C of the disk 8 slips down from the cam 8C to the neutral position under the action of the neutral spring 16, so that the lever 13 comes to a halt. This pawl 17A of the fading slide 17 is disengaged from the feed screw 5B. At the same time, the electrical circuit control switch 45 provided on the back side of the disk 8 assumes the position shown in FIG. 5B, that is, th position shown by the broken lines in FIG. 7, wherein the switch 45A is off and the switch 45B is on, so that the drive motor 41 is arrested to terminate the exposure with fade-out effect.

B. Rewinding

In order to rewind the film, the rotation of the motor 41 is reversed by switching the reversing switch, in such a way that the reversing switch is arranged adjacent to a reversing switch actuating ring 44$d$. The latter has a lug which is coaxially mounted on the shaft of the gear 18 and which is made rotatable along with the gear 18 by a friction clutch 44$c$ provided between the gear 18 and the ring 44$d$ so that when the knob 19 is further turned from the closed postion in a clockwise direction, the reversing switch 44 is closed by the lug of the ring 44$d$. Thus the transfer switch 44A, 44B shown in FIG. 7 is transferred from the solid line position to the dash line position. In this case, the shutter release switch 43 is short-circuited to form a rearwardly driving circuit of the drive motor 41 that can be traced from the anode of a battery source 42 through the switch contact 44B$b$, the winding of the motor 41, contacts 44B$a$ and switches 44A, 44B to the earth. Thereupon the film is transported backwards by a conventional film transporting mechanism. In the rewinding operation, the ratchet pawl 6 for driving the overlap control disk 8 is reciprocated by rotation of the eccentrical pivot shaft 4B, so that the reverse rotation of the gear 4A as well as the forward rotation thereof causes the disk 8 to rotate in a clockwise direction in engagement with the ratchet 8A. Upon completion of rewinding of the length of film equal to that used during fade-out, in other words, when a predetermined fraction of revolution of the disk 8 is completed, the control switch 45 of the electrical circuit assumes the positon shown in FIG. 5C, wherein the switch 45A and switch 45B assume the positions shown by solid line in FIG. 7. Upon closure of the switch 45B, the reverse rotation of the motor 41 is stopped. During the rewinding operation, the stop projection 31B of the takeup reel arresting lever 31 is disengaged from the ribs of the takeup reel, because the cam follower 31A is again lifted up on the elevated cam portion 8E$_2$ on the back side of the disk 8. During the rewinding operation, the film is transported backwards to the supply reel again.

C. Exposures with Fade-in Effect

After the rewinding is completed, by the actuation of the shutter release, the driving circuit of the drive motor 41 is again formed to rotate the motor 41 in forward direction, and rotate the overlap control disk 8 in a clockwise direction by means of a pawl 6. In this case, the cam follower 11 on the lever 10 is brought into engagement with the fade-in cam 8D on the disk 8. Upon the engagement of the follower 11 on the beginning end of the cam 8D, the lever 10 and lever 13 are pivoted in a clockwise direction, so that the slide 17 is lifted up by means of the pin 15 on the lever 13 to bring the pawl 17B into engagement with the feed screw 5C. The rotation of the screw 5C driven by the motor 41 causes the slide 17 to move along the slots 17E and 17F to the left in FIGS. 2 and 3 in the direction opposite to that for fade-out, and simultaneously causes the driving gear arrangement 1e, 1f constituting part of the dissolving shutter mechanism to move to the left so that the angular position of the shutter blades 1a, 1b which defines the aperture are adjusted with reference to each other for the closed position to the fully open position. The knob 19 is turned in accordance with the adjustment of the aperture, the symbol on the knob 19 in register with the index mark 19A indicating to the operator what value the aperture is adjusted to. When the fade-in transition is completed, the projection 8F extending from the external periphery of the disk 8 kicks the restoring lever 28 at the pin 28B, so that the restoring lever is pivoted in a clockwise direction to disengage the pallet 28A from the notch 22B on the overlap setting slide 22, thereby the slide 22 is allowed to restore its original rest position under the action of the herical spring 24. The length of the fade-in cam 8D is equal to that of the fade-out cam 8C so that the length of film equal to that used during the fade-out is double-exposed. Upon completion of the fade-in transition, the levers 10 and 13 together with the fading slide 17 come into a halt in their neutral positions. One revolution of the disk 8 causes the stop portion 8B to be positioned just under the tip of the ratchet pawl 6 so that the overlapping apparatus is made inoperative until the overlap starter knob 22D is advanced again. So long as the release button is depressed, the exposures with fade-in effect is followed by customary exposures.

The safety mechanism in corporated in the overlapping apparatus described above comprises the shutter aperture locking member 20, the safety crank 38, a part of the overlap setting member 22, a part of the arresting member 28 engaging therewith, the overlap release member 34 and the like.

This safety mechanism cannot be seen in any conventional overlapping apparatus, performing functions mainly of avoiding the mis-operation of the overlapping apparatus and of stopping only the overlapping operation in order to prevent a mishap to the apparatus due to the damage occurred during overlapping operation from occurring, while maintaining the normal operation of the camera for customary exposures.

As the means for avoiding the mis-operation of the overlapping apparatus, there is provided a safety crank interlocking with the shutter aperture locking member 20. The safety crank 38 is arranged to be engageable with and disengageable from the overlap setting member 22, governing the possibility of the overlapping operation. In other words, the safety crank can assume the first and second positions. When the shutter aperture locking member 20 is in the shutter aperture locking position, it assumes the first position wherein the overlap setting member 22 is blocked against advancement by engagement between the proturbance 38B and the extension 22C. Therefore, during customary exposures, or preparatory to photographing, or during the conveyance of the camera, where the shutter aperture adjusting means is usually locked in the fully open position, the setting to the overlapping operation by accident can be avoided.

In the next place, how the safety means functions to remove the damage occurred during overlapping operation will be explained in detail herebelow. When the operator desires to interrupt the overlapping operation because of the occurrence of a damage in the film magazine, or the failure of exposures during the first transition of the overlapping operation, that is, during fade-out, he may depresses the button 34 in the direction indicated by arrow R (see FIGS. 2 and 4). The depression of the button 34 causes the takeup reel arresting lever 31 to turn about the pivot 32 in a counterclockwise direction, thereby the stop lug 31B is disengaged from the rib 35A of the disk 35 coaxial to the shaft of the takeup reel, so that the takeup reel starts to rotate in forward direction. Further when the button is depressed, the movable contact 37A of the switch 37 is brought into contact with the other contact to close the switch.

The switch 37 is arranged to be connected in parallel with switch 45A so that even if the switch 45a is turned off by interruption of the fade-out, the motor 41 is energized through its driving circuit associated with the closed switch 37 to permit normal operation of customary exposure. The button 34 when depressed during the overlapping operation is locked on by engagement of its channel 34B with the extension 28C of the restoring lever 28 biased by a helical spring 30. This engagement continues until one revolution of the disk 8 which causes the projection 8F to engage the pin 28 of the restoring lever 28 permits the overlap setting member 22 to restore its original position, so that only once the button 34 is depressed, the button 34 is automatically locked on there, and the interruption of the overlapping operation is smoothly followed by normal operation.

In other words, when the fade-out is interrupted by the depression of the button 34, only the fade-out goes on until the pin 11 is disengaged from the fade-out cam 8C. But when the fade-out is completed, the manually turnable aperture control knob 19 is turned by hand to align the symbol (0) indicating the fully open position with the index mark 19A, and then the aperture locking member 20 is displaced to the left by way of the knob 20D so that the notch 18A of the aperture control gear 18 receives the tooth 20a of the locking member 20 and simultaneously the pin 15 on the lever 13 engages the notch 20B of the locking member 20. Therefore, the pivotal movement of the lever 10 caused by the engagement with the fade-in cam is absorbed by the spring 14, thereby the transmission to the fading slide 17 being interrupted. Further the switch 37 is turned on to prevent the reverse rotation, so that normal operation can be carried out subsequent to the fade-out.

Figure 6:
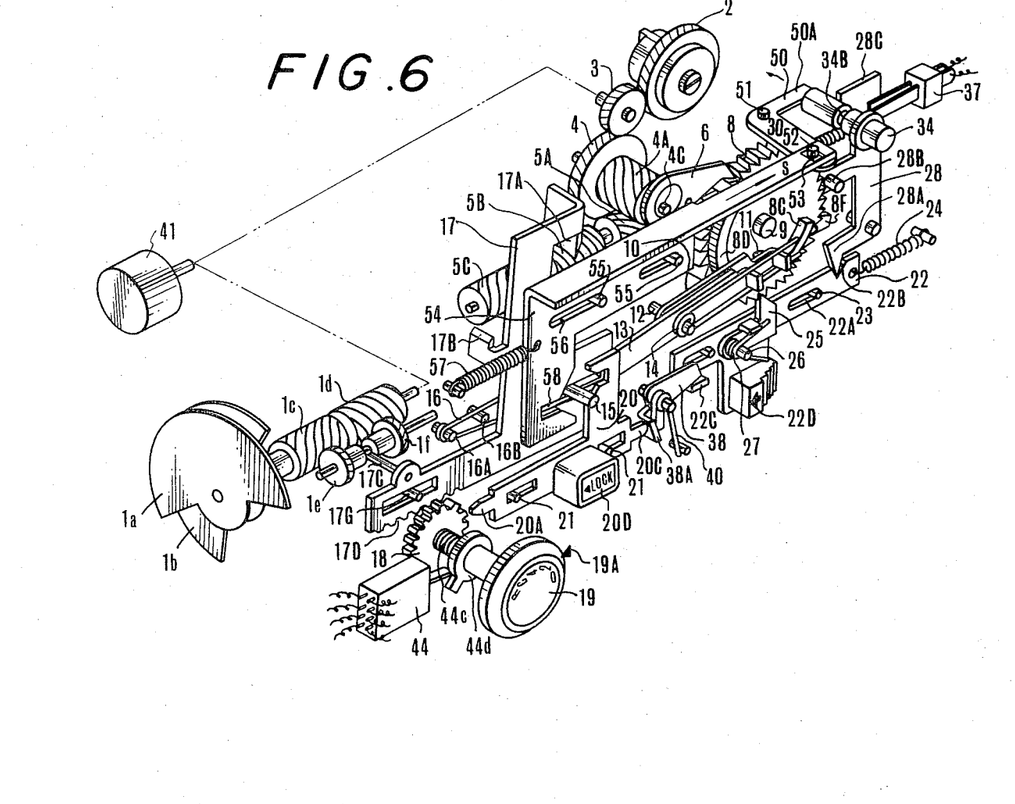
FIG. 6 is an exploded perspective view of another embodiment of the overlapping apparatus according to the present invention.

FIG. 6 illustrates another embodiment of the overlapping apparatus according to the present invention with a modification of the safety mechanism of the first embodiment described above. The overlapping apparatus of this embodiment is adapted to receive the film magazine having no reverse rotation blocking mechanism. Constitutional parts of the second embodiment corresponding to those shown in the preceeding first embodiment are indicated at the same characters to omit or simplify the explanation.

The overlapping apparatus shown in FIG. 6 is under fade-out operation wherein one shutter blade 1a is not in register with the other 1b. The rear face of the overlap control disk 8 is provided with conductive portions on which the slides of the control switch 45 travel as shown in FIGS. 4 and 5, but no surface cams 8E₁ and 8E₂.

A lever 50 is pivotally mounted on the pin 51 fixed on the housing, one arm of the lever 50 engaging the button 34 of the safety mechanism for overlapping operation, and the other arm having a pin 52 planted thereon with which a slot 53 of a fading release slide 54 is engaged. The slide 54 which has elongated slots 56 engaging the pins 55 fixed on the housing and a notch 58 which receives the pin 15 planted on the lever 13 is normally attracted by a helical spring 57 in the direction opposite to that indicated by arrow S. The lever 50 and slide 54 together with the before-mentioned safety crank 38 constitute a safety mechanism of the overlapping apparatus.

The operation of the safety mechanism shown in the second embodiment will be explained below. Each transition of the overlapping operation is the same as in the first embodiment provided that the takeup reel is not arrested during fade-out. Therefore, the explanation for the transitions has been omited. Further the operation of the safety crank 38 provided as a safety means for avoiding the mis-operation of the overlapping apparatus and interlocked with the aperture locking member 20 is similar to that shown in the first embodiment.

In order to interrupt the fading operation at any time during fade-out or fade-in, the button 34 is depressed to turn the lever 50 about the pivot 51 in a counterclockwise direction so that the fading release lever 54 is displaced along the elongated slots 56 in the direction indicated by arrow S against opposition of the helical spring 57. The depressed button 34 is locked on by the engagement of the channel 34B with the extension 28C of the restoring lever 28 under action of the herical spring 30. The displacement of the lever 54 permits the notch 58 to receive the pin 15 so that the lever 13 is forced to come to a halt in the neutral position. At the same time, the fading slide 17 whose elongated slot 17F engages the pin 15 is thus urged to return to the neutral position either from the fade-out position or from the fade-in position. Therefore, the manually turnable aperture control knob 19 may be turned to adjust the aperture to the maximum size as soon as the button is depressed. In this case, while the lever 13 having the pin 15 planted thereon also is forced to return to the neutral position, the lever 10 of which the pin 11 rides on the internal periphery of the fade-out cam 8C during fade-out and rides on the external periphery of the fade-in cam 8d during fade-in, does not restore its original neutral position during both fade-out and fade-in.

The transfer switch 45 assumes the position shown by solid lines in FIG. 7 during fade-out or fade-in, so that the depression of the button 34 by which the switch 37 is turned on does not reverse the motor 41. Further, even when a time interval necessary for fade-out has happened with rotation of the disk 8 and the switch 45A is turned off, the driving circuit of the motor 41 is maintained to energize the motor 41, because the switch 37 is on. Therefore normal operation can be carried out subsequent to fade-out.

After the interruption of the overlapping photography, the control disk 8 continues to rotate until one revolution is completed. Finally, the projection 8F kickes the restoring lever at the pin 28B, thereby the overlap setting slide 22 is disengaged from the lever 28 to restore the original position and simultaneously the extension 28C is disengaged from the channel 34B to release the button 34 from the locked position.

It will be seen from the foregoing description that the described embodiments accomplish the abovementioned objects by providing an overlapping operation setting means stabilized against actuation which cannot be set unless the shutter blade locking means is released, and further providing an overlapping apparatus having the overlapping operation setting means incorporated therein in conjunction with a safety device capable of being actuated at any time during the operation of the overlapping apparatus which, when once the overlapping operation setting means is actuated, does not return to its rest position until one cycle consisting of fade-out, rewind and fade-in is completed so that upon actuation of the safety device, the takeup reel arresting means is released, or the fading means is disengaged, or the overlapping operation is interrupted by turning on the safety switch means connected in parallel with the arresting switch associated with the forward driving circuit of the film drive motor, for example, the fade-out transistion is followed by normal operation without being successively followed by rewind and fade-in transition. Therefore, the present invention has eliminated conventional defects and drawbacks that when a damage has occurred in the film magazine before one cycle of the overlapping operation is completed, the operation of the camera subsequent thereto must be abandoned, or one cycle of the overlapping operation is completed in vain, thereby providing an added advantage of carrying out normal operation subsequent to fade-out transition without interruption therebetween.

Thus with the stabilized overlapping apparatus of the present invention, a high quality cine camera which accommodates an overlapping apparatus is efficiently improved in camera operation with respect to the avoidance of damages.

What is claimed is:

1. An overlapping photographing device for a motion picture camera comprising;
   a shutter having a variable-exposure aperture,
   means for driving said shutter, means operatively coupled to said driving means for varying said shutter aperture in a fade-out sequence and in a fade-in sequence, means for alternatively transporting a film in a forward or a reverse direction in accordance with said fade-out sequence and in a film reversing sequence of said overlapping photographing, switching means for operating said film transporting means to establish it in one of a forward transport state and a reverse transport state, overlapping photography control means selectively operable in synchronization with said shutter driving means for automatically controlling the operation of said shutter aperture varying means and said switching means at selected times, said control means being arranged not returnable to an original rest position thereof when once operated, and a safety mechanism arranged in interlocking relationship with said control means, said mechanism having a manually operable member which when actuated terminates the operation of said control means at any time during the operation thereof.

2. A device according to claim 1, wherein said safety mechanism is further provided with a means for governing the starting of the operation of the said control means, said means making it impossible for said control means to operate in itself when said camera is out of the automatically controlling effect of said control means.

3. A device according to claim 1, wherein said safety mechanism is further provided with a means for preventing said shutter aperture varying means and said control means from being engaged with each other in response to the actuation of said manually operable member in order for said control means to be incapable of controlling the operation of said shutter aperture varying means.

4. A device according to claim 1, wherein said safety mechanism is further provided with a means for maintaining said switching means in the film forward state in response to the actuation of said manually operable member in order for said control means to be incapable of controlling the operation of said switching means so that the reversing sequence of film can be made ineffective thereby.

5. A device according to claim 1 wherein said safety mechanism is further provided with a means capable, upon the actuation of said manually operable member, of holding the transition of the safety mechanism to the operative state during a predetermined operation time of said control means.

6. A device according to claim 1 in which said safety mechanism is further provided with a detecting means for detecting the termination of operation of said control means and a means for resetting said safety mechanism in response to the detecting operation of the detecting means so that when a previously selected time interval has passed, the control means terminates the control of all the sequences of the overlapping photography, and the safety mechanism is reset from its operative state to inoperative state.

7. In a motion picture camera including a film takeup shaft being engageable with a film winding spindle of a film magazine contained a roll of film, an overlapping photographing device comprising, in combination;

a shutter having an adjustable opening,
means for driving said shutter, means for adjusting said shutter opening in fading sequences of said device, means for alternatively establishing said device in one of a film forward transport state and a film reverse transport state, means for deactuating said film takeup shaft for an interval during the adjustment of said shutter opening from an open to a closed position, overlapping photography control means selectively operable for automatically controlling the operation of said shutter opening adjusting means, and alternatively film transport establishing means and said film takeup shaft deactuating means at selected times, and a safety mechanism capable of blocking said control means against operation in the middle of the operation of said control means to permit said device to perform normal photographing operation, said mechanism being engageable selectively and operatively with said control means.

8. A device according to claim 7, in which said safety mechanism is provided with a means accessible at the exterior of the camera in order to block siad control means against the control operation of said film takeup shaft deactuating means.

9. A device according to claim 7, in which said film takeup shaft deactuating means includes a means for stopping the takeup speed of the film takeup shaft with respect to the film forward transporting speed in fade-out sequence.

10. In a motion picture camera including a dissolving device comprising, in combination;

a shutter having an adjustable opening,
means for driving said shutter,
a fading mechanism for adjusting said shutter opening in a fade-out sequence and a fade-in sequence, means for transporting a film alternatively in a forward direction and a reverse direction, means for alternatively establishing said film transport means in one of a forward transport state and a reverse transport state, control means selectively and operatively driven for automatically controlling the operation of said fading mechanism and said alternatively establishing means at selectd times, means for driving said control means in synchronized relationship with said shutter driving means, operating means for operatively coupling said control means to said driving means for the control means, and a safety mechanism capable of blocking said control means against operation, said mechanism permitting the movement of said control means itself to terminate the control operation of said fading mechanism and said alternatively establishing means so long as said control means is driven by its driving means.

11. A device according to claim 10 in which said safety mechanism is provided with a first safety means capable of assuming either a position of permitting the operation of said operating means or a position of arresting it, and a second safety means capable of assuming either a position of peritting the control operation of said control means or a position of arresting it.

12. A device according to claim 10, in which said control means includes;

programming means having respective portions for controlling time intervals of a fade-out sequence and a fade-in sequence, and switch means for controlling time intervals of the forward transport and the reverse transport of said film.

13. In a motion picture camera, a combination comprising;

means for controlling the amount of light admitted to the camera, a fading mechanism operatively engageable with said light amount controlling means, a film transport mechanism for alternatively transporting film in a forward direction and a reverse direction, driving means connected to drive said light amount controlling means in a synchronized manner, switching means for operating said film transport mechanism to establish it in one of a forward transport state and a reverse transport state, fade-out and fade-in sequences controlling means being selectively and operatively coupled to said driving means for automatically controlling the time intervals of the operation of said fading mechanism and said switching means, and a safety mechanism actuatable during the operation of said controlling means in order to make it impossible for said fade-out and fade-in sequences controlling means to perform the automatic controlling function, said mechanism having at least a portion for terminating the operation of said fading mechanism.

14. The combination according to claim 13, in which said safety mechanism includes a portion for arresting said switching means so that change over from a forward transport state to reverse transport state is impossible.

* * * * *